US006922981B1

(12) United States Patent
Tyree (10) Patent No.: US 6,922,981 B1
(45) Date of Patent: Aug. 2, 2005

(54) POWER EQUIPMENT WITH A SINGULAR MOTOR

(75) Inventor: Hillard Tyree, Hamilton, OH (US)

(73) Assignee: Princetree, LLC, Oxford, OH (US)

( * ) Notice: Subject to any disclaimer, the term of this patent is extended or adjusted under 35 U.S.C. 154(b) by 0 days.

(21) Appl. No.: 10/714,422

(22) Filed: Nov. 17, 2003

(51) Int. Cl.[7] .............................................. A01D 34/00
(52) U.S. Cl. ............................................ 56/2; 56/12.7
(58) Field of Search .............................. 56/12.7, 13.5, 56/13.7, 2, 16.7, 16.9, DIG. 9; 37/241

(56) References Cited

U.S. PATENT DOCUMENTS

| 3,040,590 | A | | 6/1962 | Smithburn |
| 3,603,162 | A | | 9/1971 | Gohler |
| 4,343,139 | A | | 8/1982 | Lowry et al. |
| 4,354,564 | A | * | 10/1982 | Watanabe et al. .......... 180/19.1 |
| 4,389,836 | A | | 6/1983 | Lowry et al. |
| 4,446,679 | A | * | 5/1984 | Thomas ........................... 56/2 |
| 5,449,140 | A | | 9/1995 | Lastowski |
| 5,526,708 | A | | 6/1996 | Hill |
| D375,963 | S | | 11/1996 | Braun et al. |
| 5,771,670 | A | * | 6/1998 | Perry .......................... 56/12.1 |
| 5,787,693 | A | | 8/1998 | Dyke |
| 5,826,414 | A | * | 10/1998 | Lenczuk ..................... 56/14.7 |
| 6,003,611 | A | * | 12/1999 | Martinez ..................... 172/15 |
| 6,359,344 | B1 | | 3/2002 | Klein et al. |
| 6,606,845 | B1 | * | 8/2003 | Spies .......................... 56/16.7 |
| 6,722,445 | B2 | * | 4/2004 | Ohta et al. .................... 172/42 |

* cited by examiner

Primary Examiner—Robert E. Pezzuto
Assistant Examiner—Alicia Torres
(74) Attorney, Agent, or Firm—Charles R. Wilson (57) ABSTRACT

Power equipment widely used in commercial, residential and recreational settings comprises a host implement and a demountable motor. The host implement has a working piece dedicated to a single task. The host implement has a frame, a mounting block secured to the frame, a driven shaft connected to the frame with a working piece connected to one terminus and a self-locating and locking coupler on the other terminus. The demountable motor has a drive shaft with a second self-locating and locking coupler on its terminus. When the demountable motor is positioned on the host implement, the respective couplers mechanically mate so that a power from the demountable motor can be transferred to the working piece. The demountable motor is capable of being used on any one of several different host implements, all designed for performing different work tasks.

16 Claims, 6 Drawing Sheets

POWER EQUIPMENT WITH A SINGULAR MOTOR

FIELD OF THE INVENTION

This invention relates to commercial, residential, and recreational power equipment, including light industrial equipment, lawn and garden equipment, home shop equipment, sporting equipment and the like. More particularly, the invention relates to power equipment having a host implement designed for a specific work purpose and a singular motor usable on several different purpose host implements.

BACKGROUND OF THE INVENTION

Small motors are used to drive numerous pieces of power equipment. Equipment used commercially such as portable conveyors for roofing and other purposes, in-the-field welders, pressure washers, trenchers, etc. may be used daily depending on the business. Power equipment for use in the home and garden is used periodically as needed, often on a very occasional basis. Lawn mowers, both walk-behind and riding, lawn edgers, weed trimmers, and snow blowers are examples of power equipment which can be found in the typical suburban home. Wood lathes, sanders, table saws, and drills are examples of power equipment which are more specialized, though still widely found in many homes. Recreational power equipment such as ATV's, ski mobiles, boats, and bikes are experiencing increased use during vacation and week-end periods.

Numerous other examples exist of power equipment powered by a small motor. The typical power equipment has a single dedicated use. It is designed as a unit with a motor and an implement driven by the motor. The end result is that the typical business or home has numerous pieces of power equipment which must be stored until the need arises for its use. If the motor or any part of the implement is damaged beyond repair, the whole piece of equipment is thrown out. Needless to say, there is a tremendous waste of equipment both during times of non-use and when disposal of partly damaged equipment occurs.

Equipment designed to do multi work tasks has been designed to address the aforediscussed need. Thus, there is power equipment which has a frame with a motor and various attachments, each designed for a specific work task, e.g. grass trimming, sidewalk edging, and debris blowing. If an attachment is damaged, it is replaced at a reasonable cost. U.S. Pat. No. 3,603,162 describes one such piece of equipment.

There also have been attempts at providing larger power equipment where a single motor can be used to run various devices. U.S. Pat. Nos. 3,040,590, 5,449,140, 5,526,708, and 5,787,693 contain descriptions of such equipment. The described products have not found widespread use.

There is a need for power equipment where a singular motor can be used on numerous host implements, each designed for a different work task. The motor must be readily moved from implement to implement as needed with a minimum of effort. The implement itself must be able to receive the motor without equipment modification and without a need for tools such as wrenches or screw drivers. Most people simply do not want to use the effort or feel they lack sufficient skills to remove and install motors. In accord with this need, there now has been developed power equipment based on a singular motor capable of powering several different implements.

SUMMARY OF THE INVENTION

Power equipment used in commercial, residential and recreational settings comprise one or more host implements and a demountable motor. The host implement has a frame, a mounting block secured to a surface of the frame, a driven shaft associated with the frame and a working piece operably attached to one terminus of the driven shaft. The host implement also includes a first self-locating and locking coupler attached to the other terminus of the driven shaft. The demountable motor has a drive shaft and a second self-locating and locking coupler. The self-locating and locking couplers mechanically mate together to transfer power when the demountable motor is positioned on the host implement. A latch is also provided for securing the host implement to the demountable motor. The demountable motor is readily installed and removed from various host implements designed for different work tasks as need dictates.

DETAILED DESCRIPTION OF THE INVENTION

The power equipment of the invention is based on a singular motor and one or more host implements. The host implements illustrated and discussed in detail below are a grass trimmer and a power washer. Numerous other host implement of all natures are contemplated for use with the singular motor.

Host implements can be broadly classified as light commercial implements, lawn and garden implements, home shop implements, and recreational implements. They can be wheeled for ease of use or ease of transport. They can also be stationary. Examples of light commercial implements include pumps, winches, hoists, and portable conveyors. Examples of lawn and garden implements include grass mowers, including walk-behind mowers, riding mowers and pull behind mowers, tillers, cultivators, edgers, brush cutters, grass trimmers, mulcher/chippers, wood splitters, trenchers, lawn vacs, post hole diggers, power washers, and snow blowers. Examples of home shop implements include air compressors, saws, including table saws and radial saws, drills, welders, wood lathes, and grinder/sanders. Examples of recreational implements include all terrain vehicles, bikes, boats, and ski mobiles. Other broad categories of implements and other implements in the above enumerated implement categories are contemplated for use in this invention. In all instances, the host implement has a driven shaft which receives rotational power from a motor and transfers that power to a working piece operably associated with the driven shaft. The working piece can be directly attached to the driven shaft or it can be indirectly driven, as by a belt. As used herein, working piece is intended to cover the member driven directly or indirectly by the driven shaft which actually performs the intended work task.

Figure 1:
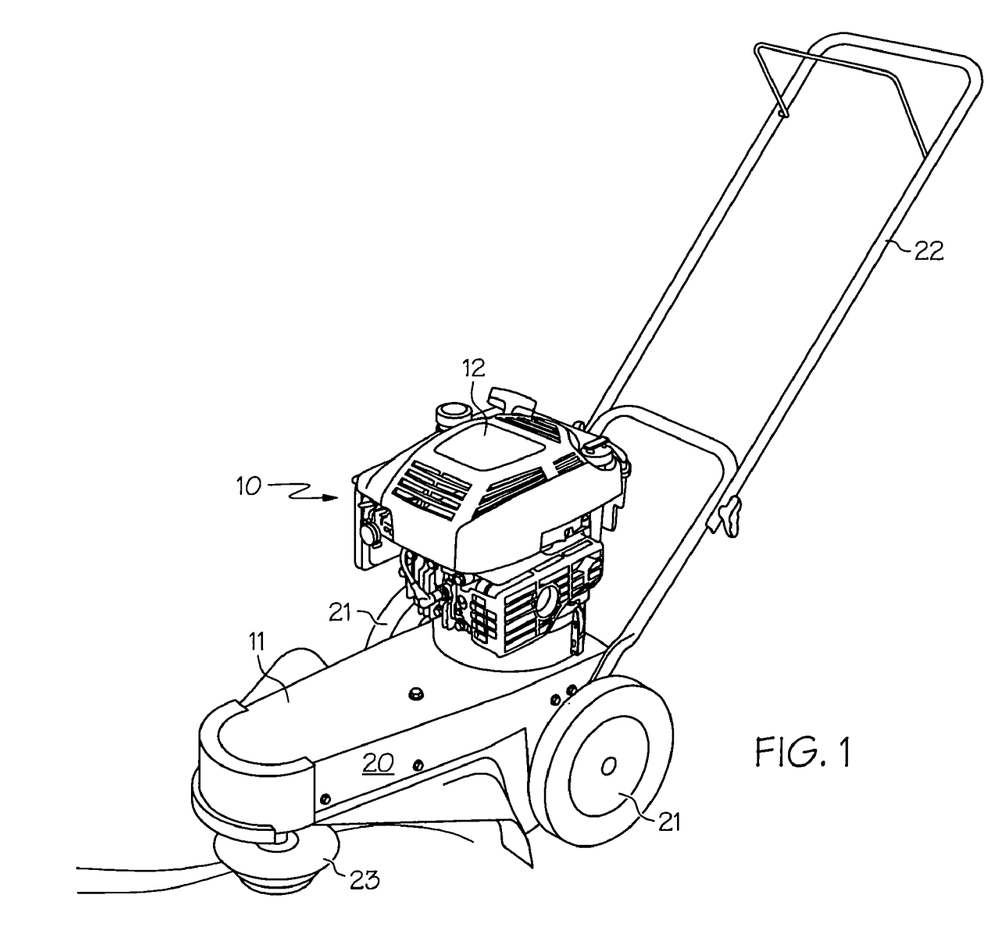
FIG. 1 is an environmental view of my power equipment which is based on a host implement designed for grass trimming and a demountable motor.
Figure 2:
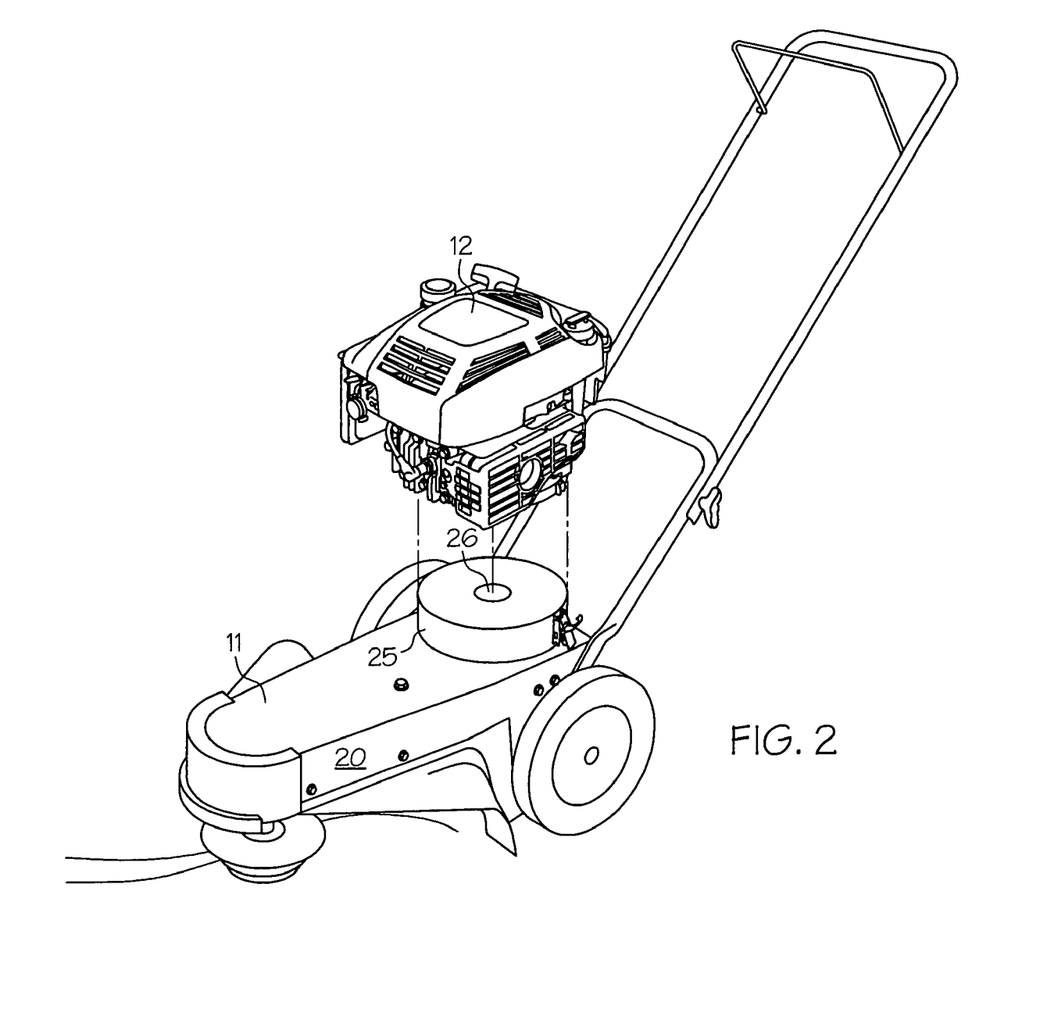
FIG. 2 depicts the power equipment of FIG. 1 in an exploded view with its demountable motor separated from its host implement.
Figure 6:
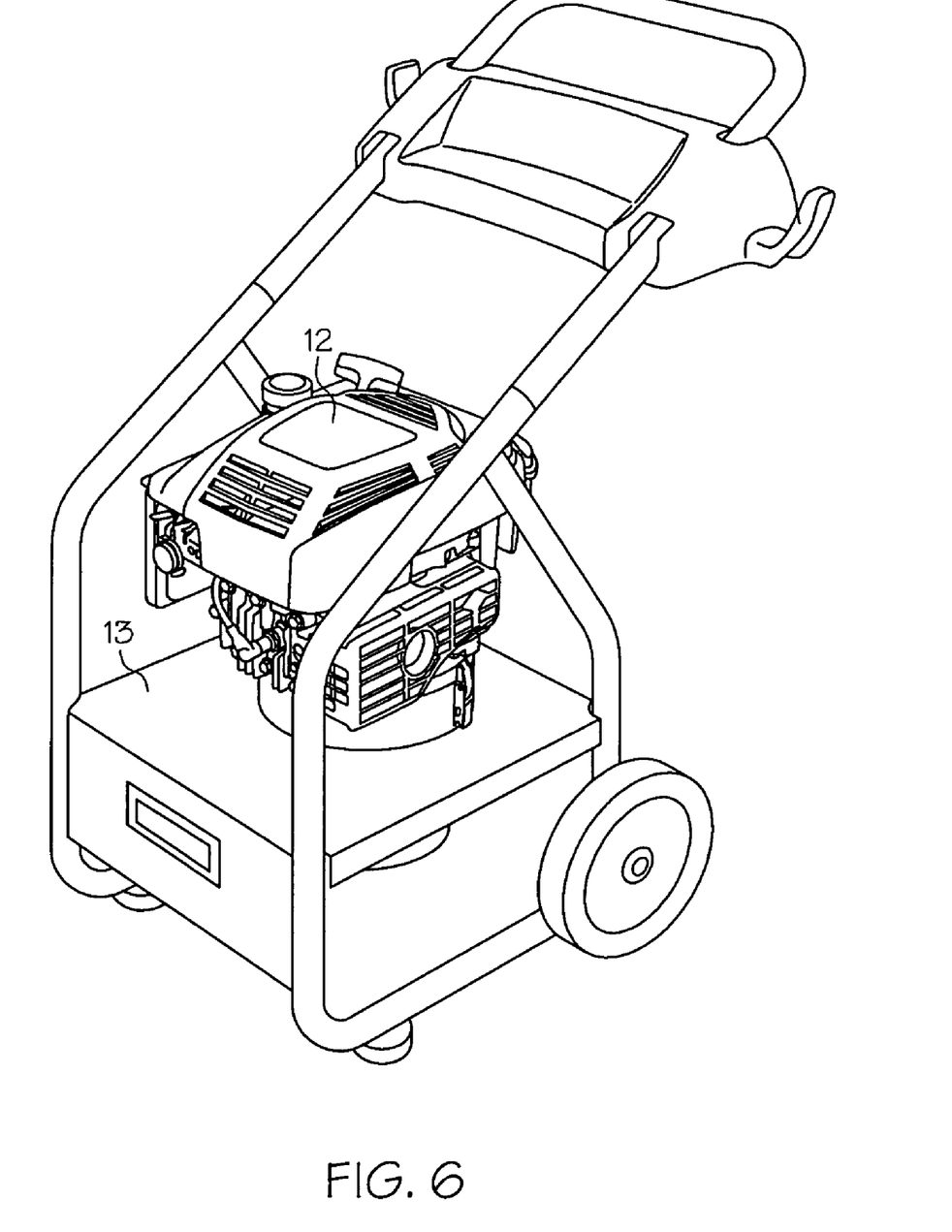
FIG. 6 is an environmental view of other power equipment of the invention based on a host implement designed for power washing and the demountable motor shown in FIG. 1.

With reference to FIGS. 1 and 2, there is shown power equipment 10 intended to trim grass and weeds. The power equipment 10 comprises a host implement 11 and a demountable motor 12. FIG. 1 shows the host implement 11 and demountable motor 12 latched together ready for work. FIG. 2 shows the host implement 11 detached from the demountable motor 12 such as occurs when the motor is being transferred to another host implement. Thus, FIG. 6 shows the demountable motor 12 secured to another host implement 13 which serves as a power washer.

The host implement 11 has a frame 20, an axle attached to the frame with two wheels 21, a handle 22 with operating controls and a working piece 23. The working piece 23 is comprised of a spool wound with a synthetic cutting line. A belt connected to a driven shaft to transfer power from the demountable motor 12 to the working piece 23 is not depicted in FIG. 1, though is well known and conventional in operation. The driven shaft, also not shown in FIGS. 1 and 2 is connected to the host implement in a conventional manner.

Figure 3:
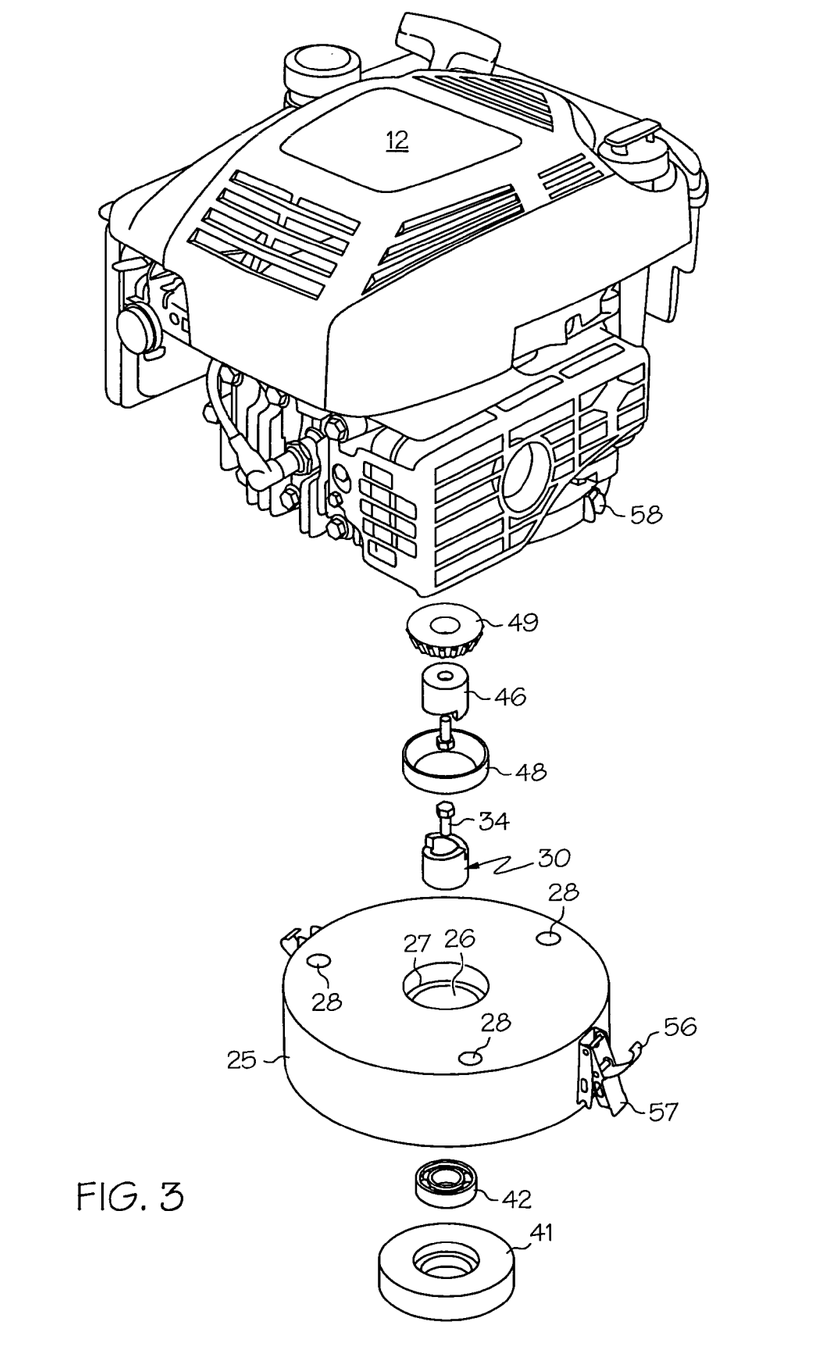
FIG. 3 is an exploded view in perspective of the demountable 25 motor of the power equipment of FIG. 1 and operably associated components.

In accord with this invention and with reference to FIG. 2, the host implement has a mounting block 25 secured to its frame's top surface. The mounting block is preferably made of plastic and is to accommodate self-locating and locking couplers and roller bearing assemblies discussed in detail below. A hole 26 extends vertically through the approximate center of the mounting block 25. As seen in FIG. 3, the hole 26 has a recessed shoulder 27 at a top surface surrounding the hole 26. Now with reference to FIG. 5, the mounting block is bolted to the frame 20. As should be apparent, the mounting block 25 and the hole 26 are dimensioned to receive the drive shaft 45 of the demountable motor 12. The height of the mounting block 25 is dependent primarily on the length of the drive shaft on the demountable motor. The diameter of the hole 26 is sufficiently large to receive the couplers and a roller bearing assembly.

Figure 5:
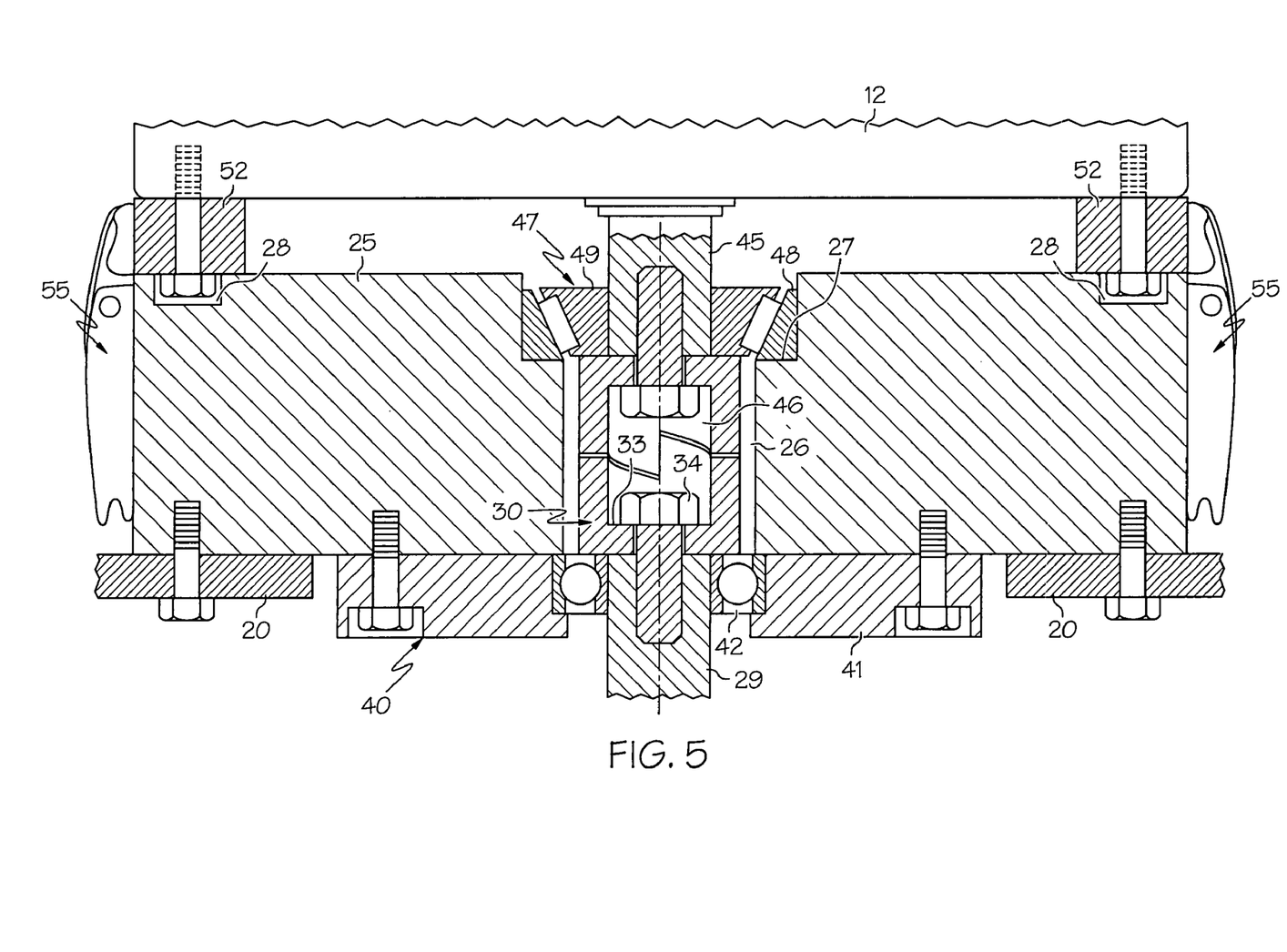
FIG. 5 is a partial section view of the power equipment of FIG. 1 showing components of the host implement and the demountable motor operably coupled together.

Still with reference to FIG. 5, the mounting block 25 is provided with a set of recesses 28 in its top surface. The recesses 28 are to receive bolt heads used in mounting a spacer to the demountable motor 12 as further discussed below.

It is preferred, though not necessary, that a groove extend across the top of the mounting block 25. The groove is to help locate the demountable motor in its proper position when mounting it on the host implement. The groove also serves an anti-torque function during running of the motor.

Figure 4:
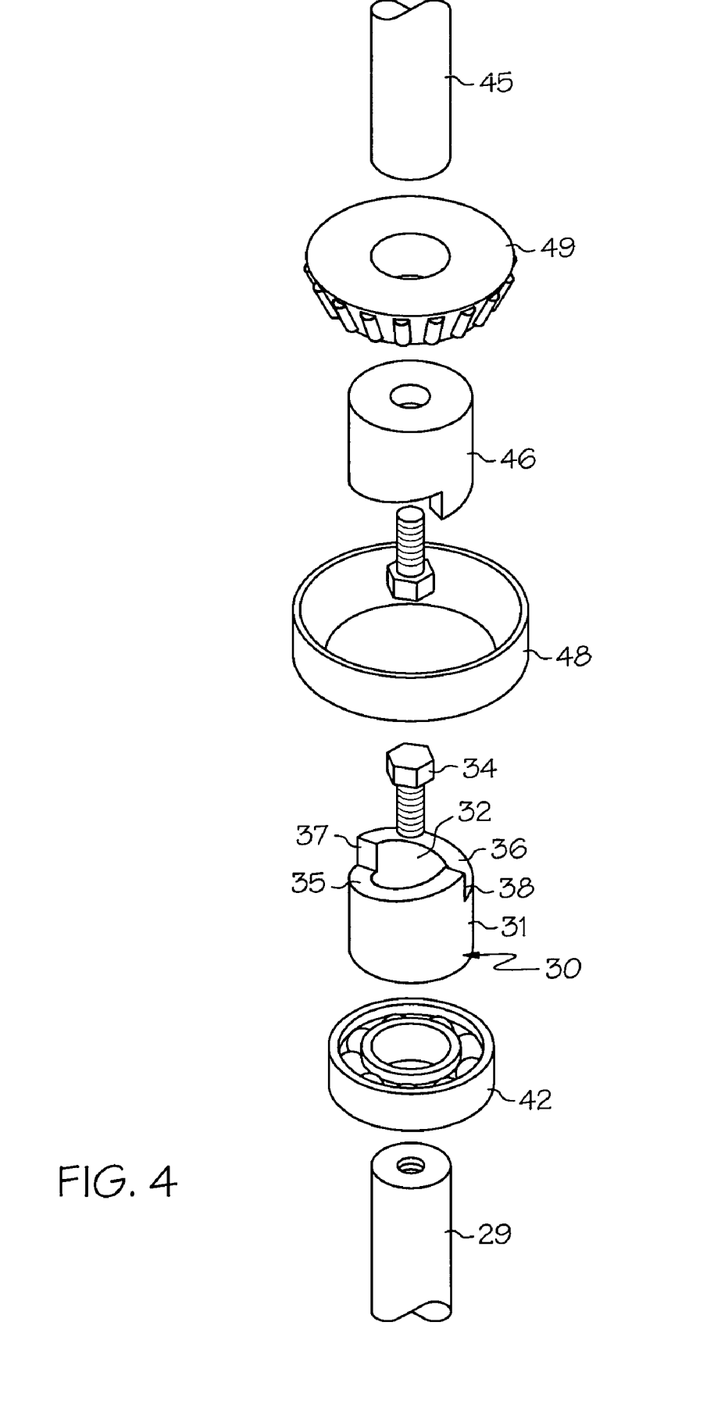
FIG. 4 is an exploded view in perspective of the demountable motor's drive shaft, the host implement's driven shaft and operably associated components.

With reference to FIGS. 4 and 5, there is shown a portion of the host implement's driven shaft 29. It extends vertically. It should be understood the driven shaft of the host implement could as well have a horizontal orientation. A first self-locating and locking coupler 30 is secured to a terminus of the driven shaft 29. The coupler 30 has a cylindrical-shaped body 31 with a centered bore hole 32 extending axially from the top surface of a first 5 terminus partially into the member to create a shoulder 33 on which a head of a bolt 34 rests. A smaller bolt hole continues from the shoulder 33 to a second terminus of the cylindrical-shaped member 31. The bolt 34 extends through the bolt hole into a threaded bolt hole extending axially into the driven shaft 29.

The coupler 30 is further characterized in having two opposed spiral ramps extending from the first terminus of the coupler, preferably at least about one-fourth vertical inch and more preferably about one-fourth inch to about three-fourths inch. A first spiral ramp 35 extends downwardly an approximate half-turn to a mid-line extending horizontally through a center of the cylindrical-shaped member 31. A second spiral ramp 36 extends downwardly an approximate half-turn and to the same mid-line, though in an opposite direction. Each ramp has a flat engaging surface. The two flat surface ramps have a first vertical stop 20 wall 37 and a second vertical stop wall 38 at the end of the respective ramps. Each vertical stop wall is preferably at least about one-fourth inch in height, more preferably about one-fourth inch to about three-fourths inch.

The spiral ramps and stop walls of the first self-locating and locking coupler 30 are used to mechanically mate with spiral ramps and stop walls of a second self-locating and locking coupler 46 associated with the demountable motor. As apparent in FIG. 5, the spiral ramps of the two couplers do not have to touch and preferably do not so as to allow a proper mounting and smoother transferring of power. The stop walls 37 and 38 when engaged by stop walls of the second self-locating and locking coupler cause motion in the drive shaft to rotate the driven shaft.

Still with reference to FIG. 5, a roller bearing assembly 40 is associated with the driven shaft 29. It is not always needed, though its inclusion is preferred to ensure the driven shaft 29 rotates smoothly without substantial vibration, particularly when the driven shaft is being used to run a pulley associated with the working piece. The assembly 40 comprises a bearing block 41 bolted to the bottom of the mounting block 25 and a roller bearing race 42 positioned within the bearing block 41 and encompassing the driven shaft 29. Such roller bearing assemblies for this purpose are well known and commercially available.

Again with reference to FIGS. 3–5, the demountable motor 12 has a downwardly extending drive shaft 45. The motor can be gas powered or electric powered. Commercially available motors having about one-half HP to about ten HP are typically used in the invention. Smaller or larger motors can be used. If the host implement requires a more horizontally disposed drive shaft, then the demountable motor is so positioned. While not shown in detail, the demountable motor 12 has customary starting means and operating controls, e.g. a choke and throttle. A second self-locating and locking coupler 46 is bolted to a terminus of the drive shaft. It is identical in structure and function to the first self-locating and locking coupler 30.

A roller bearing assembly 47 is also operably associated with the drive shaft 45. The roller bearing assembly 47 comprises a tapered sleeve 48 permanently positioned within the recess in the hole 26 of the mounting block 25. A tapered roller bearing member 49 is positioned around the end of the drive shaft 45 and is held in place by the second self-locating and locking coupler 46 as best seen in FIG. 5. As with the roller bearing assembly 40 associated with the driven shaft, the roller bearing assembly 47 guides its associated shaft to ensure smooth running. It also serves as an aid in positioning the demountable motor onto the host implement.

As apparent in FIG. 5, the first and second self-locating and locking couplers mechanically mate when the demountable motor 12 is properly positioned on the host implement 11. During mounting, a slight downward push on the demountable motor is sufficient to rotate the drive and/or driven shafts until the spiral ramps of the first and second self-locating and locking couplers mate properly.

While not always needed, depending primarily on the length of the demountable motor's drive shaft 45, a spacer 52 is bolted to the underside of the motor. The height of the spacer 52 is selected according to the height needed to cause the two self-locating and locking couplers to mechanically mate. It can be one cylindrical-shaped piece or, as shown, three distinct block-shaped members equi-spaced around the periphery of the mounting block 25.

A latch 55 is provided to hold the host implement 11 and demountable motor 12 securely together during operation, yet readily releasable during a transferring step. The latch used on the power equipment 10 comprises at least two sets of a pivoting hook component 56 with handle 57 attached to the mounting block 25 and a keeper component 58 attached to the spacer 52 on the demountable motor 12.

In operation, a host implement having a working piece needed for the task at hand is selected. The demountable motor is positioned on the host implement so that the respective self-locating and locking couplers mate. Latch components on the host implement and the demountable motor are engaged. Once the particular task is completed, the latch can be disconnected and the demountable motor simply lifted and positioned on another host implement for a different task. The change-over is done quickly, e.g. in less than a minute. No tools such as wrenches, screw drivers and the like are needed.

It is highly desireable that a throttle control be positioned directly on the motor to accommodate different power needs of the host implement. Also, an all weather carburetor is desired given the fact the demountable motor could be used under warm or cold weather conditions. Optional features can be included on the host implement or demountable motor to make them easier to use. For example, a handle can be installed on the demountable motor to facilitate the lifting and dropping the motor in place on the host implement. A protective cover over the demountable motor's exhaust pipe is also desireable to prevent accidental heat burn to the user during any motor changeover step. Still other features can be added to facilitate use of the power equipment can be utilized.

Minimal power loss is experienced in transferring power from the drive shaft of the demountable motor to the driven shaft of the host implement. Moreover, since continual use of the motor is now possible with several host implements and throughout the year, power loss through rust and other deterioration that occurs when a motor is only occasionally used is lessened. In effect, full use of the motor is now achieved.

It further should be apparent that a great savings is achieved by the need for only one motor to run several different host implements. For commercial use, a spare demountable motor can be made available in case the primary demountable motor breaks down or needs periodic service. Thus, a work task can be completed with minimal downtime. Even servicing is made easier since the motor alone can be taken away without having to also transport the host implement. Storage space is also saved. That is, it now becomes feasible, without the weight of a motor, to hang several host implements from a garage or shed wall. Floor space is freed for other purposes. Repair/replacement costs are also achieved in that only the damaged motor or host implement portion of the equipment needs to be repaired or replaced. The invention lends itself to inclusion on original equipment as well as part of a kit to retrofit existing conventional equipment.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. Commercial, residential, and recreational power equipment based on a singular motor usable on multiple host implements, where each host implement has a dedicated working piece for performing a particular work task, said power equipment comprising:

a. a host implement having a (i) frame, (ii) a mounting block secured to the frame, said mounting block having a hole extending vertically therethrough, (iii) a driven shaft connected to the frame with a first terminus and a second terminus, (iv) a working piece operably attached to the second terminus of the driven shaft, (v) a first self-locating and locking coupler with a coupler terminus having opposed offset spiral ramps, each said spiral ramp extending in opposite directions a half-turn so as to create a stop wall at an end of each spiral ramp wherein said first self-locating and locking coupler is attached to the first terminus of the driven shaft and extends into the hole in the mounting block, and (vi) a first latch component; and b. a demountable motor removably secured to the host implement, said demountable motor having a drive shaft with a second self-locating and locking coupler attached to a terminus thereof, said second self-locating and locking coupler with a coupler terminus having opposed offset spiral ramps, each said spiral ramp extending in opposite directions a half-turn so as to create a stop wall at an end of each spiral ramp wherein said second self-locating and locking coupler is configured to mechanically mate with the first self-locating and locking coupler on the host implement for transferring a rotation force from the drive shaft of the demountable motor to the driven shaft of the host implement for driving the working piece and further having a second latch component for semi-permanently attaching to the first latch component on the host implement, whereby the demountable motor is readily removed from the host implement by an unlatching and lifting action and is capable of being mounted on another host implement for performing another work task.

2. The commercial, residential, and recreational power equipment of claim 1 further having roller bearing assemblies operably associated with the driven shaft of the host implement and the drive shaft of the demountable motor.

3. The commercial, residential, and recreational power equipment of claim 2 wherein a bearing block is secured to an underside of the mounting block and a roller bearing race is positioned within the bearing block to encompass the driven shaft.

4. The commercial, residential, and recreational power equipment of claim 2 wherein the mounting block on the host implement has a recess at the top of the hole for receiving a tapered sleeve and further a tapered roller bearing member is mounted on the drive shaft of the demountable motor to fit within the tapered sleeve.

5. The commercial, residential, and recreational power equipment of claim 1 wherein each said self-locating and locking coupler has a recessed shoulder at a center of its terminus and a bolt hole to receive a bolt for attachment to the driven shaft of the host implement and the drive shaft of the demountable motor.

6. The commercial, residential, and recreational power equipment of claim 1 wherein the first and second self-locating and locking couplers each has a cylindrical-shaped body with a centered vertical bore hole extending axially from a first terminus partially into the cylindrical-shaped body to create a shoulder at a bottom of the bore hole, a first spiral ramp extending from the first terminus an approximate half-turn to a mid-line extending horizontally through a center axis of the cylindrical-shaped body and ending to create a first substantially vertical stop wall, a second spiral ramp extending axially from the first terminus in an opposite direction from the first spiral ramp an approximate half-turn to the mid-line and ending to create a second substantially vertical stop wall, and a vertical bolt hole extending axially from the shoulder of the centered vertical bore hole.

7. The commercial, residential, and recreational power equipment of claim 6 wherein the driven shaft of the host implement and the drive shaft of the demountable motor each has a threaded bolt hole extending axially into a terminus and further wherein a first bolt extends through the bolt hole of the first self-locating and locking coupler into the threaded bolt hole of the driven shaft and a second bolt extends through the bolt hole of the second self-locating and locking coupler into the threaded bolt hole of the drive shaft.

8. Commercial, residential, and recreational power equipment based on a singular motor usable on multiple host implements, where each host implement has a dedicated working piece for performing a particular work task, said power equipment comprising:
   a. a host implement having a (i) frame, (ii) a mounting block secured to the frame, said mounting block having a hole extending vertically therethrough and having a recessed shoulder surrounding the hole in the top surface thereof, (iii) a driven shaft connected to the frame with a first terminus and a second terminus, (iv) a working piece operably attached to the second terminus of the driven shaft, (v) a first self-locating and locking coupler attached to the first terminus of the driven shaft and extending into the hole in the mounting block, (vi) a first latch component, and (vii) a roller bearing assembly attached to an underside of the mounting block and operably associated with the driven shaft; and
   b. a demountable motor removably secured to the host implement, said demountable motor having a (i) drive shaft, (ii) a second self-locating and locking coupler attached to a terminus of the drive shaft, said second self-locating and locking coupler configured to mechanically mate with the first self-locating and locking coupler on the host implement for transferring a rotation force from the drive shaft of the demountable motor to the driven shaft of the host implement for driving the working piece, (iii) a roller bearing assembly operably associated with the drive shaft, and (iv) a second latch component for semi-permanently attaching to the first latch component of the host implement, whereby the demountable motor is readily removed from host implement by an unlatching and lifting action and is capable of being mounted on another host implement for performing another work task.

9. The commercial, residential, and recreational power equipment of claim 8 wherein a bearing block is secured to an underside of the mounting block and a roller bearing race is positioned within the bearing block to encompass the driven shaft.

10. The commercial, residential, and recreational power equipment of claim 8 wherein the mounting block on the host implement has a recess at the top of the hole for receiving a tapered sleeve and further a tapered roller bearing member is mounted on the drive shaft of the demountable motor to fit within the tapered sleeve.

11. The commercial, residential, and recreational power equipment of claim 8 wherein the terminus of each of the first and second self-locating and locking couplers has opposed offset spiral ramps, each said spiral ramp extending in opposite directions from the terminus a half-turn so as to create a stop wall at the end of each spiral ramp.

12. The commercial, residential, and recreational power equipment of claim 10 wherein each said self-locating and locking coupler has a recessed shoulder at a center of its terminus and a bolt hole to receive a bolt for attachment to the driven shaft of the host implement and the drive shaft of the demountable motor.

13. The commercial, residential, and recreational power equipment of claim 8 wherein the first and second self-locating and locking couplers each has a cylindrical-shaped body with a centered vertical bore hole extending axially from a first terminus partially into the cylindrical-shaped body to create a shoulder at a bottom of the bore hole, a first spiral ramp extending from the first terminus an approximate half-turn to a mid-line extending horizontally through a center axis of the cylindrical-shaped body and ending to create a first substantially vertical stop wall, a second spiral ramp extending axially from the first terminus in an opposite direction from the first spiral ramp an approximate half-turn to the mid-line and ending to create a second substantially vertical stop wall, and a vertical bolt hole extending axially from the shoulder of the centered vertical bore hole.

14. The commercial, residential, and recreational power equipment of claim 13 wherein the driven shaft of the host implement and the drive shaft of the demountable motor each has a threaded bolt hole extending axially into a terminus and further wherein a first bolt extends through the bolt hole of the first self-locating and locking coupler into the threaded bolt hole of the driven shaft and a second bolt extends through the bolt hole of the second self-locating and locking coupler into the threaded bolt hole of the drive shaft.

15. Commercial, residential, and recreational power equipment based on a singular motor usable on multiple host implements, where each host implement has a dedicated working piece for performing a particular work task, said power equipment comprising:
   a. a host implement having a (i) frame, (ii) a mounting block secured to the frame, said mounting block having a hole extending vertically therethrough and having a recessed shoulder surrounding the hole in the top surface thereof, (iii) a driven shaft connected to the frame with a first terminus and a second terminus, (iv) a working piece operably attached to the second terminus of the driven shaft, (v) a first self-locating and locking coupler attached to the first terminus of the driven shaft and extending into the hole in the mounting block, said first self-locating and locking coupler having a cylindrical-shaped body with a centered vertical bore hole extending axially from a first terminus partially into the cylindrical-shaped body to create a shoulder at a bottom of the bore hole, a first spiral ramp extending from the first terminus an approximate half-turn to a mid-line extending horizontally through a center axis of the cylindrical-shaped body and ending to create a first substantially vertical stop wall, a second spiral ramp extending axially from the first terminus in an opposite direction from the first spiral ramp an approximate half-turn to the mid-line and ending to create a second substantially vertical stop wall, and a vertical bolt hole extending axially from the shoulder of the centered vertical bore hole, and (vi) a first latch component; and b. a demountable motor removably secured to the host implement, said demountable motor having a (i) drive shaft, (ii) a second self-locating and locking coupler attached to a terminus of the drive shaft, said second self-locating and locking coupler having a cylindrical-shaped body with a centered vertical bore hole extending axially from a first terminus partially into the cylindrical-shaped body to create a shoulder at a bottom of the bore hole, a first spiral ramp extending from the first terminus an approximate half-turn to a mid-line extending horizontally through a center axis of the cylindrical-shaped body and ending to create a first substantially vertical stop wall, a second spiral ramp extending axially from the first terminus in an opposite direction from the first spiral ramp an approximate half-turn to the mid-line and ending to create a second substantially vertical stop wall, and a vertical bolt hole extending axially from the shoulder of the centered vertical bore hole so to mechanically mate with the first self-locating and locking coupler on the host implement for transferring a rotation force from the drive shaft of the demountable motor to the driven shaft of the host implement for driving the working piece, (iii) a roller bearing assembly operably associated with the drive shaft, and (iv) a second latch component for semi-permanently attaching to the first latch component of the host implement, whereby the demountable motor is readily removed from the host implement by an unlatching and lifting action and is capable of being mounted on another host implement for performing another work task.

16. The commercial, residential, and recreational power equipment of claim 15 wherein the driven shaft of the host implement and the drive shaft of the demountable motor each has a threaded bolt hole extending axially into a terminus and further wherein a first bolt extends through the bolt hole of the first self-locating and locking coupler into the threaded bolt hole of the driven shaft and a second bolt extends through the bolt hole of the second self-locating and locking coupler into the threaded bolt hole of the drive shaft.

* * * * *